(12) United States Patent
Choi et al.

(10) Patent No.: US 11,300,679 B2
(45) Date of Patent: Apr. 12, 2022

(54) RADAR SITE POSITIONING APPARATUS FOR OPTIMAL WEATHER RADAR NETWORK AND METHOD THEREOF

(71) Applicant: Korea Meteorological Administration, Seoul (KR)

(72) Inventors: Youn Choi, Seoul (KR); Sung-Hwa Jung, Seoul (KR); Woomi Jung, Seoul (KR); Young-A Oh, Seoul (KR); Hae-Lim Kim, Seoul (KR)

(73) Assignee: Korea Meteorological Administration, Seoul (KR)

( * ) Notice: Subject to any disclaimer, the term of this patent is extended or adjusted under 35 U.S.C. 154(b) by 324 days.

(21) Appl. No.: 16/392,183

(22) Filed: Apr. 23, 2019

(65) Prior Publication Data

US 2019/0324138 A1 Oct. 24, 2019

(30) Foreign Application Priority Data

Apr. 24, 2018 (KR) .......................... 10-2018-0047279

(51) Int. Cl.
*G01S 13/95* (2006.01)
*G01S 7/02* (2006.01)
*G01S 7/40* (2006.01)
*G06T 7/40* (2017.01)
*G01S 13/00* (2006.01)

(52) U.S. Cl.
CPC ............ *G01S 13/951* (2013.01); *G01S 7/023* (2013.01); *G01S 7/40* (2013.01); *G01S 7/4052* (2013.01); *G06T 7/40* (2013.01); *G06T 2207/30181* (2013.01)

(58) Field of Classification Search
CPC ....... H04L 47/82; G06K 9/00637; G01V 1/24
See application file for complete search history.

(56) References Cited

U.S. PATENT DOCUMENTS

| 8,265,870 | B1* | 9/2012 | Nguyen | G01V 1/24 |
| | | | | 701/450 |
| 8,374,391 | B1* | 2/2013 | Erignac | G06K 9/00637 |
| | | | | 382/103 |
| 2014/0266856 | A1* | 9/2014 | LaPoint | G01S 13/951 |
| | | | | 342/59 |
| 2019/0238801 | A1* | 8/2019 | Boyless | H04L 47/82 |

OTHER PUBLICATIONS

R. Minciardi et al., "A decision support system for the optimal planning of a weather radar network: a case study"; Proceedings of ERAD (2002); pp. 388-393; published by Copernicus GmbH, Gottingen, Germany; copyright in the year 2002. (Year: 2002).*

* cited by examiner

*Primary Examiner* — Bernarr E Gregory
(74) *Attorney, Agent, or Firm* — Heedong Chae; Lucem, PC

(57) ABSTRACT

Disclosed are an apparatus for selecting a radar installation site for configuring a radar observation network and a method thereof. That is, according to the present invention, an optimal radar observation site is selected through a digital elevation model, GIS information, a beam shield simulation, a propagation environment survey, etc., to collect higher accurate radar data and shorten a time required for a radar installation preliminary survey, etc.

8 Claims, 16 Drawing Sheets

RADAR SITE POSITIONING APPARATUS FOR OPTIMAL WEATHER RADAR NETWORK AND METHOD THEREOF

CROSS-REFERENCE TO RELATED APPLICATIONS

This application claims the priority of Korean Patent Application No. 10-2018-0047279 filed on Apr. 24, 2018, in the Korean Intellectual Property Office, the disclosure of which is incorporated herein by reference.

BACKGROUND OF THE INVENTION

Field of the Invention

The present invention relates to an apparatus for selecting a radar installation site for configuring a radar observation network and a method thereof and more particularly, an apparatus for selecting a radar installation site for configuring a radar observation network and a method thereof which selects an optimal radar observation site through a digital elevation model, GIS information, a beam shield simulation, a propagation environment survey, and the like.

Description of the Related Art

Weather radar is equipment which is very important in prediction of local torrential rains, flood, etc., because the weather radar provides high-resolution observation data to a wide area.

However, the weather radar is remote detection equipment using a signal returned by receiving an electromagnetic wave to the air and observation efficiency of radar varies depending on radio interference or shielding by terrains and buildings, and a degree of transmitting/receiving the electromagnetic wave.

In particular, the observation efficiency is very important in a low layer maximally close to a ground surface for ground precipitation estimation, low-layer blast prediction, and the like using the weather radar.

However, Korean terrain is a complex mountain terrain and when low-layer observation is performed by the terrain, the shielding of the electromagnetic wave by the terrain may not be avoided. Therefore, domestic radar operating institutions install and operate the weather radar a high mountain peak in order to maximally reduce an influence of terrain shielding and observe the wide area. When the weather radar is installed on the peak of the mountain, the influence of the shielding may be reduced, but the low layer observation is impossible which is important in precipitation estimation and low-layer blast prediction.

Therefore, in terms of a weather radar position, it is important to install the weather radar at a height point as low as possible without the influence of the shielding, but when Korean complex terrains are considered, it is realistically importable to select a location through site exploration and satellite image analysis of all mountains including small hills, mountaintops, etc., in the area in order to select an installation point of the weather radar.

SUMMARY OF THE INVENTION

The present invention has been made in an effort to provide an apparatus for selecting a radar installation site for configuring a radar observation network which selects an optimal radar observation site through a digital elevation model, GIS information, a beam shield simulation, a propagation environment survey, etc., and a method thereof.

The present invention has also been made in an effort to provide an apparatus for selecting a radar installation site for configuring a radar observation network, which configures all combinations of observation networks available according to the number of radars to be used as an observation network for a final selected candidate point, excludes an observation network without an overlapping area, calculates target height observation efficiency of the observation network in one or more final observation target areas selected, selects at least one observation network in which the calculated target height observation efficiency of the observation network exceeds a predetermined reference value as a first observation network, calculates a ratio of areas to be observed by two or more radars in an observation target area of the calculated first observation network, ranks the observation network according to the ratio of the areas to be observed by two or more radars in the observation target area of the calculated first observation network, and outputs the observation network according to the ranking, and a method thereof.

According to an aspect of the present invention, there is provided a method for selecting a radar installation site for configuring a radar observation network, the method comprising: receiving, by a communication unit, digital terrain information transmitted from a server; selecting, by a control unit, a first radar installation site candidate based on the received digital terrain information; selecting, by the control unit, a second radio site candidate by evaluating accessibility and an available infrastructure of the radar installation site based on geographic information system (GIS) information for the selected first radar installation site candidate; selecting, by the control unit, a third radar installation site candidate by performing a beam shield simulation for the selected second radar installation site candidate, and calculating radar observation efficiency for a result of the performed beam shield simulation; selecting, by the control unit, a fourth radar installation site by performing a radio interference examination for the selected third radar installation site candidate; selecting, by the control unit, a radar observation network depending on target height observation efficiency for each combinationable observation network for the selected fourth radar installation site candidate; and selecting, by the control unit, a radar observation network priority depending on analysis of an overlapping area for the first observation network for each selected radar installation site candidate.

The selecting of the first radar installation site candidate may include: setting a target area in which a radar is to be installed from the received digital terrain information; confirming grid points satisfying a predetermined lowest height reference according to the purpose of a user in the digital terrain information with respect to the set target area, grouping grid points which are adjacent to each other 2D-spatially, and generating one or more groups; selecting as a small area at least one group which remains after excluding a group including a grid point where a highest height of the grid point is equal to or higher than a predetermined highest height reference in the group from the radar installation site candidate, among the one or more grouped groups; calculating a spatial texture with all grid points in the small area around the grid point having the highest height in the at least one selected small area; and selecting as the first radar installation site candidate one or more remaining small areas after excluding a small area where the spatial texture calculated for each small area is smaller than a predetermined threshold value among the one or more selected small areas.

The selecting of the second radar installation site candidate may include determining conditions including whether a road exists in each radar installation site candidate based on the GIS information with respect to the selected first radar installation site candidate, whether a vehicle is capable of passing through the corresponding road, and whether there is a facility for supplying power within a predetermined radius and selecting as the second radar installation site candidate a small area satisfying all of the conditions in the selected first radar installation site candidate.

The selecting of the third radar installation site candidate may include; performing a beam shield simulation for height angles of 0.0° to 3.0° which are a predetermined range at a predetermined interval of 0.1° for the selected second radar installation site candidate in order to simulate the shield area by the terrain; calculating radar observation efficiency for the performed beam shield simulation result; and selecting as the third radar installation site candidate at least one small area in which the radar observation efficiency calculated for each second radar installation site candidate is more than a predetermined radar observation efficiency threshold among the one or more small areas, second radar installation site candidates.

The selecting of the fourth radar installation site candidate may include examining a propagation interference by radio interference for the selected third radar installation site candidate and selecting the fourth radar installation site candidate at least one radar installation site candidate excluding radar installation site candidates detected by a signal of a predetermined specific strength or more in a frequency range capable of being adjusted by the radar in the selected third radar installation site candidates.

The selecting of the radar observation network may include: configuring all combinations of the observation networks according to the number of radars to be used in a predetermined observation network for the selected fourth radar installation site candidate; acquiring at least one combination of the observation networks as the fourth radar installation site candidate by excluding an observation network having no radar overlapping area in a predetermined observation radius from all the combinations of the observation networks configured as the fourth radar installation site candidate; selecting an area to be observed with respect to at least one combination of the observation networks for each acquired fourth radar installation site candidate; calculating target height observation efficiency for the selected area to be observed for each observation network; and selecting an observation network, in which each calculated target observation efficiency is more than a predetermined threshold with respect to the area to be observed for each observation network, as a first observation network for each fourth radar installation site candidate.

The selecting of the radar observation network priority may include: calculating a ratio of a duplicated observation area at a predetermined target height of two or more radars in the area to be observed of the first observation network with respect to the first observation network for each selected radar installation site candidate; arranging the ranking in order of a higher calculated ratio of a duplicated observation area of two or more radars in the area to be observed of the first observation network; and displaying the observation networks according to the arranged ranking.

According to another aspect of the present invention, there is provided an apparatus for selecting a radar installation site for configuring a radar observation network, the apparatus comprising: a communication unit configured to receive digital terrain information transmitted from a server; and a control unit configured to select a first radar installation site candidate based on the received digital terrain information, select a second radio site candidate by evaluating accessibility and an available infrastructure of the radar installation site based on GIS information for the selected first radar installation site candidate, select a third radar installation site candidate by performing a beam shield simulation for the selected second radar installation site candidate, and calculating radar observation efficiency for a result of the performed beam shield simulation, select a fourth radar installation site by performing a radio interference examination for the selected third radar installation site candidate, select a radar observation network depending on target height observation efficiency for each combinationable observation network for the selected fourth radar installation site candidate, and select a radar observation network priority depending on analysis of an overlapping area for the first observation network for each selected radar installation site candidate.

According to the embodiment of the present invention, an optimal radar observation point is selected through a digital elevation model, GIS information, a beam shield simulation, a propagation environment survey, etc., thereby collecting higher accurate radar data and shortening a time required for a radar installation preliminary survey, etc.

Further, after configuring all combinations of observation networks available according to the number of radars to be used as an observation network for a final selected candidate and excluding an observation network without an overlapping area, by calculating target height observation efficiency of the observation network in one or more final observation target areas selected, selecting at least one observation network in which the calculated target height observation efficiency of the observation network exceeds a predetermined reference value as a first observation network, calculating a ratio of areas to be observed by two or more radars in an observation target area of the calculated first observation network, ranking the observation network according to the ratio of the areas observed by two or more radars in the observation target area of the calculated first observation network, and outputting the observation network according to the ranking, a radar installation site is selected considering installation cost, feasibility, etc., thereby reducing cost and increasing total operation efficiency.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
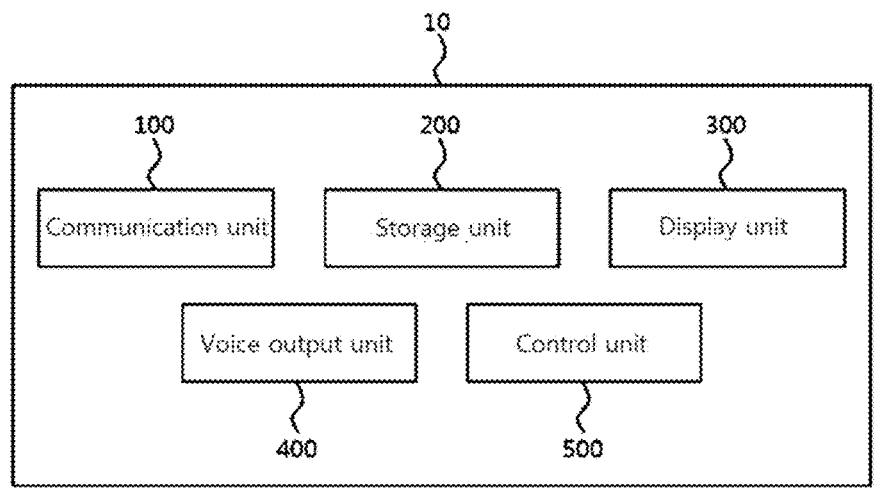
FIG. 1 is a block diagram illustrating a configuration of an apparatus for selecting a radar installation site for configuring a radar observation network according to an embodiment of the present invention.

It is noted that technical terms used in the present invention are used to just describe a specific embodiment and do not intend to limit the present invention. Further, unless the technical terms used in the present invention are particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that cannot accurately express the spirit of the present invention, the technical term is substituted by a technical term which can correctly appreciated by those skilled in the art to be appreciated. In addition, general terms used in the present invention should be analyzed as defined in a dictionary or according to front and back contexts and should not be analyzed as an excessively reduced meaning.

Moreover, if singular expression used in the present invention is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second' used in the present invention can be used to describe various components, but the components should not be limited by the terms. The terms are used only for distinguishing one component from the other component. For example, a first component may be named as a second component and similarly, the second component may also be named as the first component without departing from the scope of the present invention.

Hereinafter, preferred embodiments according to the present invention will be described in detail with reference to the accompanying drawings, and like or similar components are denoted by the same reference numerals regardless of a sign of the drawing, and duplicated description thereof will be omitted.

In describing the present invention, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present invention and it should not be analyzed that the spirit of the present invention is limited by the accompanying drawings.

FIG. 1 is a block diagram illustrating a configuration of an apparatus for selecting a radar installation site for configuring a radar observation network according to an embodiment of the present invention.

As illustrated in FIG. 1, an apparatus 10 for selecting a radar installation site is constituted by a communication unit 100, a storage unit 200, a display unit 300, a voice output unit 400, and a control unit 500. All components of the apparatus 10 for selecting the radar installation site illustrated in FIG. 1 are not required components, but the apparatus 10 for selecting the radar installation site may be implemented by more components than the components illustrated in FIG. 1 and may also be implemented by less components than the components illustrated in FIG. 1.

The apparatus 10 for selecting the radar installation site may be applied to various terminals such as a smart phone, a portable terminal, a mobile terminal, a personal digital assistant (PDA), a portable multimedia player (PMP) terminal, a telematics terminal, a navigation terminal, a personal computer, a notebook computer, a slate PC, a tablet PC, a ultrabook, a wearable device (e.g., a smartwatch, a smart glass, a head mounted display (HMD), etc.), a Wibro terminal, an IPTV TV, an Internet Protocol Television (IPTV) terminal, a smart TV, a digital broadcasting terminal, an Audio Video Navigation (AVN) terminal, an Audio/Video (A/V) system, a flexible terminal, and the like.

The communication unit 100 communicates with any internal component or with at least one external terminal via a wired/wireless communication network. At this time, the external terminal may include a server (not illustrated). Here, a wireless Internet technology includes a wireless LAN (WLAN), a digital living network alliance (DLNA), a wireless broadband (Wibro), a world interoperability for a microwave (WiMAX), a high speed downlink packet access (HSDPA), a high speed uplink packet access (HSUPA), IEEE 802.16, long term evolution (LTE), long term evolution-advanced (LTE-A), wireless mobile broadband service (WMBS), etc. The communication unit 100 transmits and receives data in accordance with at least one wireless Internet technology, including Internet technologies which are not listed above. Further, a short-range communication technology may include Bluetooth, Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. In addition, a wired communication technology may include power line communication (PLC), USB communication, Ethernet (Ethernet), serial communication, optical/coaxial cables, etc.

In addition, the communications unit 100 may mutually transmit information with any terminal via a universal serial bus (USB).

Further, communication unit 100 transmits and receives radio signals with a base station, the server, and the like on a mobile communication network constructed according to technical standards or communication methods of mobile communication (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

In addition, the communication unit 100 receives a digital terrain information (or a digital elevation model (DEM)) transmitted from the server under the control of the control unit 500.

The storage unit 200 stores various user interfaces UIs, graphical user interfaces GUIs, etc.

In addition, the storage unit 200 stores data, programs, and the like necessary for the operation of the apparatus 10 for selecting the radar installation site.

That is, the storage unit 200 may store a plurality of application programs (or applications) driven in the apparatus 10 for selecting the radar installation site, and data and commands for operation of the apparatus 10 for selecting the radar installation site. At least some of these applications may be downloaded from an external server via wireless communication. Further, at least some of these applications may be present on the apparatus 10 for selecting the radar installation site from the time of release for basic functions of the apparatus 10 for selecting the radar installation site. Meanwhile, the application programs are stored in the storage unit 200 and installed in the apparatus 10 for selecting the radar installation site, and driven to perform an operation (or function) of the apparatus 10 for selecting the radar installation site by the control unit 500.

Further, the storage unit 200 may include at least one storage medium of a flash memory type, a hard disk type, a multimedia card micro type, a card type memory (e.g., SD or XD memory, etc), a magnetic memory, a magnetic disk (ROM), an optical disk, a random access memory (RAM), a static random access memory (SRAM), a read-only memory (ROM), an electrically erasable programmable read-only memory (EEPROM), and a programmable read-only memory (PROM). Further, the apparatus 10 for selecting the radar installation site may operate a web storage performing a storage function of the storage unit 200 on the Internet or operate in associated with the web storage.

Further, the storage unit 200 stores the digital terrain information (or the digital elevation model) received by the communication unit 100.

The display unit 300 may display various contents such as various menu screens using the user interface and/or the graphic user interface stored in the storage unit 200 by the control of the control unit 500. Here, the contents displayed on the display unit 300 includes various text or image data (including various types of information data), menu screens including data of icons, a list menu, a combo box, and the like. Further, the display unit 300 may be a touch screen.

Further, the display unit 300 may include at least one of a liquid crystal display (LCD), a thin film transistor liquid crystal display (TFT LCD), an organic light-emitting diode (OLED), a flexible display, a 3D display, an electronic ink display (e-ink display), and a light emitting diode (LED).

In addition, the display unit 300 displays the digital terrain information (or the digital elevation model) received by the communication unit 100 by the control of the control unit 500.

The voice output unit 400 outputs voice information included in a predetermined processed signal by the control unit 500. Here, the voice output unit 400 may include a receiver, a speaker, a buzzer, and the like.

Further, the voice output unit 400 outputs a guidance voice generated by the control unit 500.

In addition, the voice output unit 400 outputs voice information corresponding to the digital terrain information (or the digital elevation model) received by the communication unit 100 by the control of the control unit 500.

The control unit 500 executes an overall control function of the apparatus 10 for selecting the radar installation site.

In addition, the control unit 500 executes an overall control function of the apparatus 10 for selecting the radar installation site using the programs and data stored in the storage unit 200. The control unit 500 may include a RAM, a ROM, a CPU, a GPU, and a bus, and the RAM, the ROM, the CPU, and the GPU may be connected to each other via a bus. The CPU accesses the storing unit 200 and may perform booting using an O/S stored in the storing unit 200 and perform various operations using various programs, contents, and data stored in the storing unit 200.

In addition, the control unit 500 controls the communication unit 100 to receive the digital terrain information (or the digital elevation model) transmitted from the server. Here, the digital elevation model is global terrain data generated based on data observed in the space shuttle and uses data of shuttle radar topography mission (SRTM) and basic information of the digital elevation model may be as illustrated in Table 1.

TABLE 1

| Characteristics | Value |
|---|---|
| Projection method | Geographic |
| Horizontal reference system | WSG84 |
| Vertical reference system | EGM96(Earth Gravitational Model 1996) |
| Vertical resolution | 1 m |
| Horizontal resolution | 1"arc (around 30 m) |

In addition, the control unit 500 selects a first radar installation site candidate based on the received digital terrain information (or the digital elevation model).

That is, the control unit 500 sets (or selects) a target area to which a radar (e.g., including a weather radar, etc.) is to be installed from the received digital terrain information. At this time, the target area to which the radar is to be installed may be preset or may be selected according to user input on the digital terrain information.

Further, the control unit 500 searches (or confirms) grid points satisfying a predetermined lowest height reference (e.g., a height of 70 m or more) according to the purpose of the user in the digital terrain information for the set target area and groups grid points adjacent to each other 2D-spatially into one group to generate one or more groups. In this case, when the grid points having the lowest height reference or more are continuously adjacent to each other in an east-west direction (or an x-axial direction) and/or a north-south direction (or a y-axial direction), the control unit 500 defines the grid points as the same group as each other.

Further, the control unit 500 selects as a small area at least one group remaining after excluding (or removing) the groups including the grid points having the highest height reference or more from the radar installation site candidates in the group by applying a predetermined highest height reference (e.g., height of 500 nm or less) among one or more groups.

As such, the control unit 500 searches for grid points having the lowest height reference or more in the digital terrain information for the set target area, first groups grid points having the lowest height reference or more which are continuous in an x-axial direction with respect to the searched grid points having the lowest height reference or more, secondarily groups grid points having the lowest height reference or more which are continuous in a y-axial direction among the grid points grouped in the x-axial direction, and may finally select at least one group remaining after excluding the group containing the grid points in which the highest height of the grid points in the corresponding group is the highest height reference or more from the radar installation site candidates as a small area.

Further, the control unit 500 calculates a spatial texture σ with all the grid points in the small area through the following Equation 1 based on the grid point having the highest height in at least one selected small area, by considering that it is advantageous to secure a radar observation viewing angle when the grid point having the highest height of the at least one selected small area is relatively higher than the height of the adjacent neighboring grid point.

$$\sigma_k = \sqrt{\frac{1}{N_k}\sum_{i=0}^{N_k}(H_i - h_{maxk})^2} \qquad \text{[Equation 1]}$$

That is, the control unit 500 calculates a mean square of the squared deviation for the highest height of grid points in the small area to calculate a spatial texture of all grid points in the small area based on the grid point having the highest height in the small area.

Here, the k represents a small area number, the i represents a grid point in the small area, the $N_k$ represents the number of total grid points in the small area, the $H_i$ represents a height (unit: m) of an i-th grid point, and the $h_{maxk}$ represents a highest height (unit: m) in the small area. At this time, as the spatial texture σ is larger, the highest height in the small area is higher than the surrounding area, and a possibility of having an excellent visual field is high.

Further, the control unit 500 selects as a first radar installation site candidate at least one remaining small area excluding a small area in which a spatial texture σ calculated by at least one small area is smaller than a predetermined threshold value $\sigma_T$ (e.g., 50 m) among the at least one selected small area.

Further, the control unit 500 selects a second radar installation site candidate by evaluating accessibility and available infrastructure of a radar installation site candidate which is necessarily considered for installation and operation based on geographic information system (GIS) information for the selected first radar installation site candidate.

That is, the control unit 500 evaluates whether a road exists around the selected first radar installation site candidate and the vehicle is suitable for using the corresponding road because the radar is equipment requiring periodic management and requires constant maintenance.

Further, the control unit 500 evaluates available infrastructure for a communication device and the like capable of transmitting and receiving power capable of operating the radar and the collected data. In this case, the evaluation for the available infrastructure determines whether there is a facility (e.g., including poles, artificial structures, etc.) capable of supplying the power to the vicinity of the radar installation site candidate.

In addition, the control unit 500 performs a beam shield simulation on the selected second radar installation site candidate, and calculates the radar observation efficiency of the performed beam shield simulation result to select a third radar installation site candidate. Here, the beam shield simulation is a method of mathematically considering the propagation of the radar beam and calculating the shielding rate of the beam generated by the terrain using the digital elevation model. In this case, the shape of the radar beam was assumed as Gaussian and the settings required for the simulation may be set to match the data of the weather radar, as shown in Table 2 below. Therefore, experiment settings may be adjusted depending on the type of radar to be installed.

In the embodiment of the present invention, if the terrain is 10% or more in the volume of a 50 m Gaussian radar beam, it is assumed to be shielded.

TABLE 2

| Classification | Value |
| --- | --- |
| Height angle | 0.0° to 3.0° |
| Observation range | 50 km |
| Beam width | 1.29° |
| Radar height | 15 m |
| Beam size | 50 m |

That is, the control unit 500 performs a beam shield simulation for a height angle of 0.0° to 3.0° which is a predetermined range at a predetermined interval of 0.1° for the selected second radar installation site candidate in order to simulate the shield area by the terrain. As such, the control unit 500 calculates a shield rate generated by the terrain every radar observation height angle through the beam shield simulation.

In the embodiment of the present invention, a beam shield rate (or power loss) in a function of a distance, a height angle, and an azimuth by considering a radar beam propagation model (RBPM) by assuming a standard atmosphere and a Gaussian beam pattern according to a method of Kucera et al. (2004). In the RBPM, the height of the radar beam is calculated according to the following Equation 2 by assuming a vertical refractive index change (=−39 km$^{-1}$) in standard refraction.

$$h = \sqrt{r^2 + R_e^2 + 2rR_e\sin(\theta_e)} - R_e + h_0 \qquad \text{[Equation 2]}$$

Here, the h represents a height (m) above the sea of the laser beam, the r represents a slant range (m) from the radar, the $R_e$ represents an effective earth radius (=8,494.7 km) considering the standard refraction, the $\theta_e$ represents an antenna height angle, and $h_0$ represents a height (m) above the sea of the antenna.

Further, the control unit 500 may calculate a height of the lowest end of the beam using Equation 2 above by considering a laser beam width, and estimate a terrain masking by comparing a height of the simulated lowest end and DEM data.

Further, the control unit 500 calculates a radar gate size in a sight direction and a shield (or shield rate) at a predetermined interval of 0.1° using the DEM data for high-resolution shielding simulation.

Figure 2:
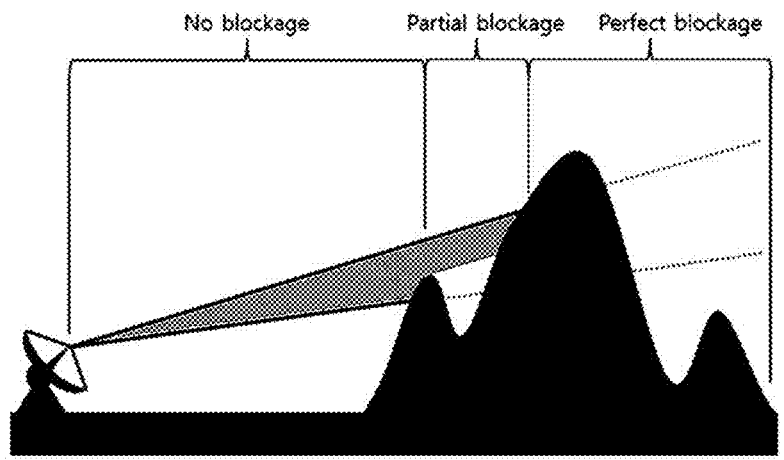
FIG. 2 is a diagram illustrating an example of radar beam shield according to an embodiment of the present invention.

Further, as illustrated in FIG. 2, the control unit 500 may estimate a terrain echo point when the lower end of the beam is lower than the DEM data, and analyze a terrain shielding by increasing a height angle at an interval of 0.1° up to the highest end of the beam and comparing the height of the beam with the DEM data.

Further, the control unit 500 calculates the shielding for each radar gate and accumulates the calculated shielding in the sight direction.

Figure 3:
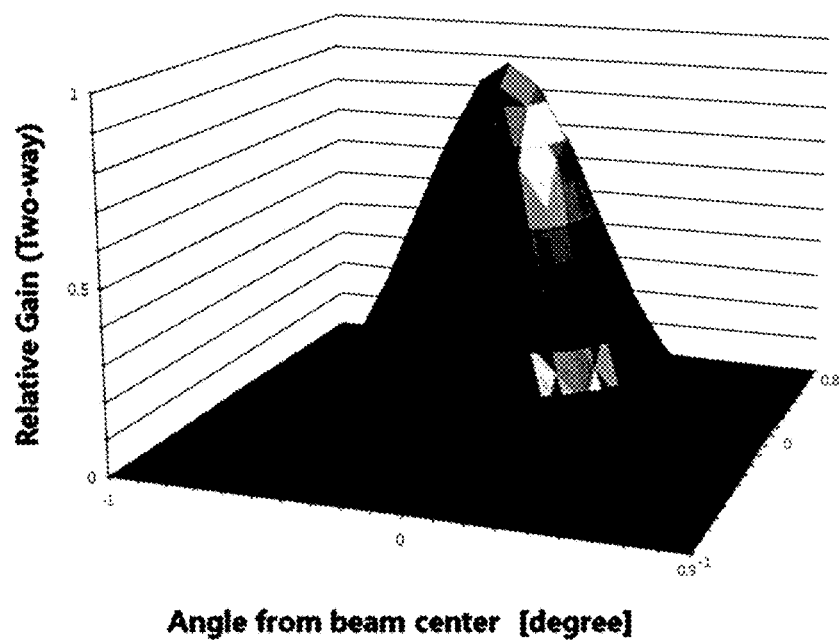
FIG. 3 is a diagram illustrating a relative gain of a Gaussian beam pattern having a two-way propagation according to an embodiment of the present invention.

Further, as illustrated in FIG. 3, in the embodiment of the present invention, in order to implement more realistic radar beam shielding, the RBPM may assume a power distribution considering a two-way propagation in a main lobe as a two-dimensional Gaussian form of the following Equation 3.

$$f(\theta) = \exp\left\{-\frac{1}{2}\left(\frac{\theta}{\sigma}\right)^2\right\}$$ [Equation 3]

Here, the $\sigma$ is $\theta_0/2.354$, the $\theta$ represents an angle in a direction of an azimuth and a height angle from the highest power point (or beam center) and the $\theta_0$ represents a beam width.

In the RBPM which has been developed according to previous studies on the accuracy of the beam pattern, a side lobe having energy very relatively smaller than that of the main lobe is not considered.

Further, the control unit 500 calculates radar observation efficiency with respect to the performed beam shield simulation result. Here, the radar observation efficiency is calculated by the number of lowest height beams which are not shielded at a predetermined target height (e.g., 1 km) or less.

Figure 4:
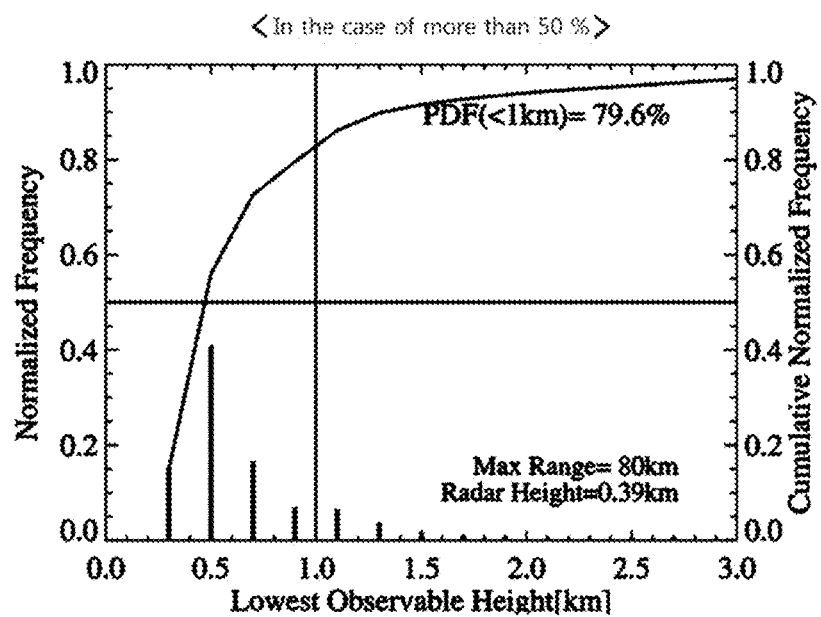
FIGS. 4 and 5 are diagrams illustrating an example of radar observation efficiency of a radar installation site candidate according to an embodiment of the present invention.
Figure 5:
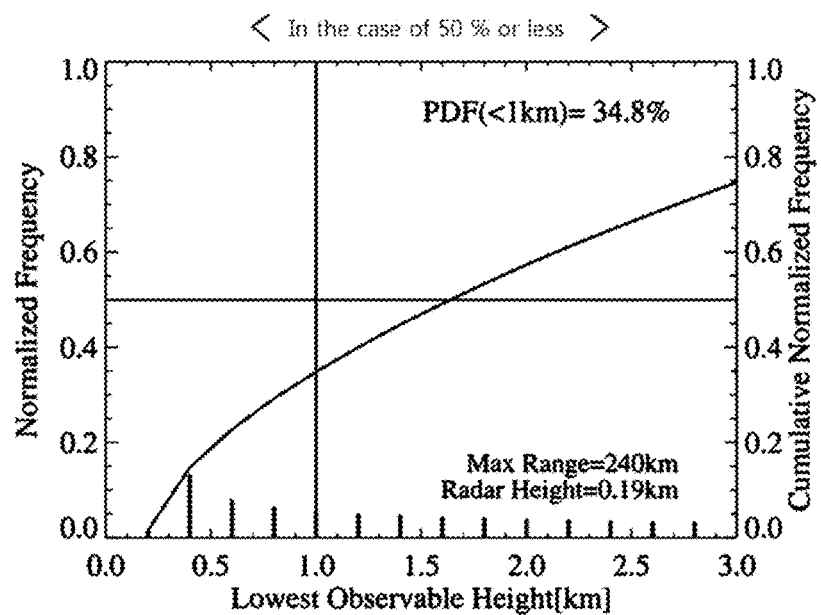

For example, FIG. 4 illustrates a case where the radar observation efficiency of the radar installation site candidate is more than 50% and FIG. 5 illustrates a case where the radar observation efficiency of the radar installation site candidate is 50% or less, in which an x axis represents the lowest observable height, a lefty axis (black) represents a normalized frequency, and a right y axis (blue) represents a cumulative normalized frequency.

As illustrated in FIG. 4, when the radar observation efficiency of the radar installation site candidate is more than 50%, the radar observation efficiency of 1 km or less is 79.6% and as illustrated in FIG. 5, when the radar observation efficiency of the radar installation site candidate is 50% or less, the radar observation efficiency of 1 km or less is 34.8%.

Further, the control unit 500 selects as a third radar installation site candidate at least one small area in which the radar observation efficiency calculated for each second radar installation site candidate is more than a predetermined radar observation efficiency threshold (e.g., 50%) in at least one small area, second radar installation site candidate.

Further, the control unit 500 examines propagation output and bands that can be operated for each radar installation site candidate and performs a radio interference examination for the selected third radar installation site candidate using measuring equipment (not illustrated) such as a spectrum analyzer (not illustrated) and a directional antenna (not illustrated) in order to determine a frequency interference at a frequency band corresponding to the radar data to select a fourth radar installation site candidate.

That is, the control unit 500 examines a propagation interference by radio interference for the selected third radar installation site candidate to select as a fourth radar installation site candidate at least one radar installation site candidate excluding radar installation site candidates detected by a signal of a predetermined specific strength (e.g., −50 dB) or more in a frequency range capable of being adjusted by the radar in the selected third radar installation site candidates.

Further, the control unit 500 selects a radar observation network according to target height observation efficiency (or target height observation efficiency of the observation network) for each combinationable observation network for the selected fourth radar installation site candidate.

That is, the control unit 500 configures all combinationable observation networks according to the number of radars to be used in a predetermined observation network for the selected fourth radar installation site candidate.

Further, the control unit 500 acquires (or selects) at least one combined observation network as the fourth radar installation site candidate by excluding an observation network having no radar overlapping area in a predetermined observation radius from all the combined observation networks configured as the fourth radar installation site candidate.

Further, the control unit 500 selects an area to be observed (or an area to be observed for each observation network) with respect to at least one combined observation network for each obtained fourth radar installation site candidate.

Further, the control unit 500 calculates target height observation efficiency (or target height observation efficiency of the observation network) for the selected area to be observed for each observation network. Here, the target height observation efficiency is calculated by the number of lowest height beams of an observation network which is not shielded at a predetermined target height or less.

Further, the control unit 500 selects an observation network, in which each calculated target observation efficiency is more than a predetermined threshold (e.g., 80%) with respect to the area to be observed for each observation network, as a first observation network for each fourth radar installation site candidate (or a first observation network for each radar installation site candidate).

Figure 6:
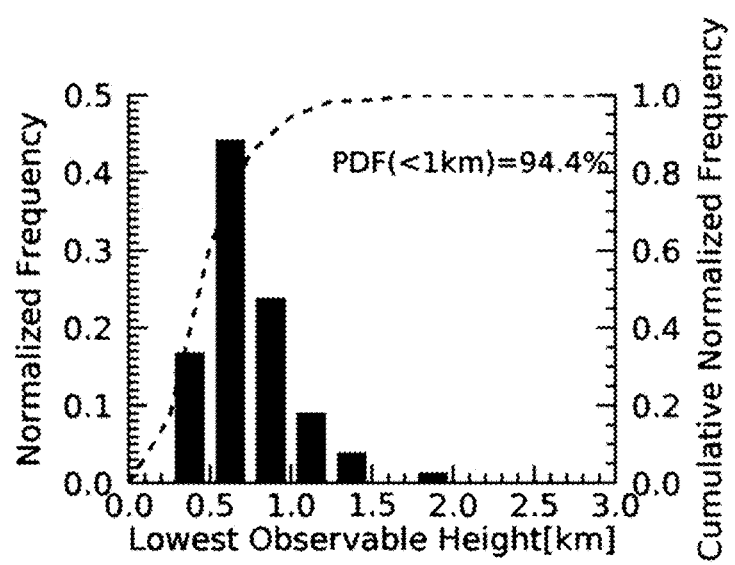
FIGS. 6 and 7 are diagrams illustrating an example of radar observation efficiency of a radar observation network according to an embodiment of the present invention.
Figure 7:
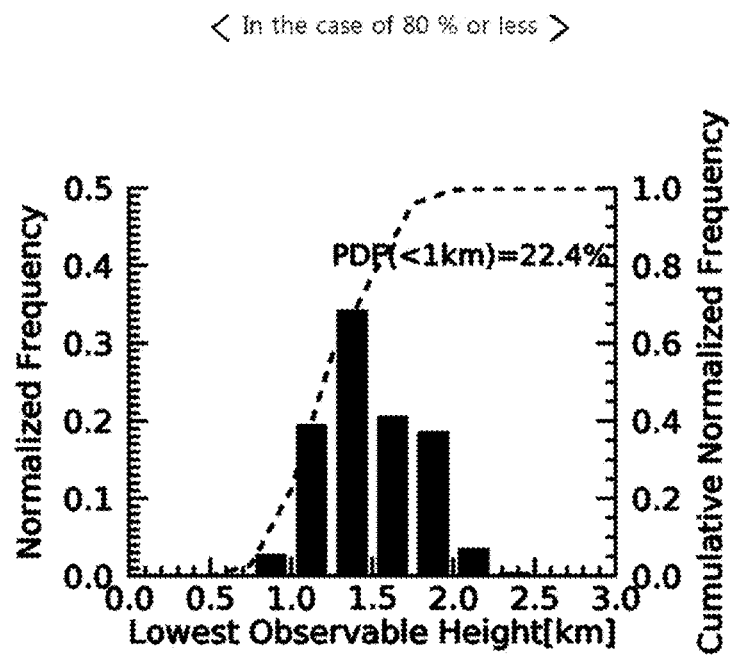

For example, FIG. 6 illustrates a case where the target height observation efficiency of the observation network at the radar installation site candidate is more than 80% and FIG. 7 illustrates a case where the target height observation efficiency of the observation network at the radar installation site candidate is 80% or less, in which an x axis represents the lowest observable height, a left y axis (black) represents a normalized frequency, a right y axis (blue) represents a cumulative normalized frequency, and a target height of the observation network is 1 km.

As illustrated in FIG. 6, when the target height observation efficiency of the observation network at the radar installation site candidate is more than 80%, the target height observation efficiency of the observation network of 1 km or less is 94.4% and as illustrated in FIG. 7, when the target height observation efficiency of the observation network at the radar installation site candidate is 80% or less, the target height observation efficiency of the observation network of 1 km or less is 22.4%.

Further, the control unit 500 selects a radar observation network priority according to analysis of the overlapping area for a first observation network for each selected radar installation site candidate and outputs an observation network according to the selected radar observation network priority.

That is, the control unit 500 calculates a ratio of a duplicated observation (or overlapping observation) area at a predetermined target height (e.g., 1 km) (or an area where the area to be observed is overlapped at the target height) of two or more radars in the area to be observed of the first observation network with respect to the first observation network for each selected radar installation site candidate.

Further, the control unit 500 determines (or arranges) the ranking in order of a higher calculated ratio of a duplicated observation area of two or more radars in the area to be observed of the first observation network and displays (or outputs) the observation networks according to the arranged ranking.

Further, the control unit 500 may finally select an observation network having the highest calculated ratio of the duplicated observation area of two or more radars in the area to be observed of the first observation network as a radar observation network site.

Thus, the optimal radar observation point may be selected through the digital evaluation model, GIS information, beam shield simulation, and propagation environment survey.

Further, as such, after configuring all combinations of observation networks available according to the number of radars to be used as an observation network for a final selected candidate and excluding an observation network without an overlapping area, it is possible to select one or more final areas to be observed, calculate target height observation efficiency of the observation network in one or more final observation target areas selected, select at least one observation network in which the calculated target height observation efficiency of the observation network exceeds a predetermined reference value as a first observation network, calculate a ratio of areas to be observed by two or more radars in an observation target area of the calculated first observation network, rank the observation network according to the ratio of the areas observed by two or more radars in the observation target area of the calculated first observation network, and output the observation network according to the ranking.

Hereinafter, a method for selecting a radar installation site for configuring a radar observation network according to the present invention will be described in detail with reference to FIGS. 1 to 16.

Figure 8:
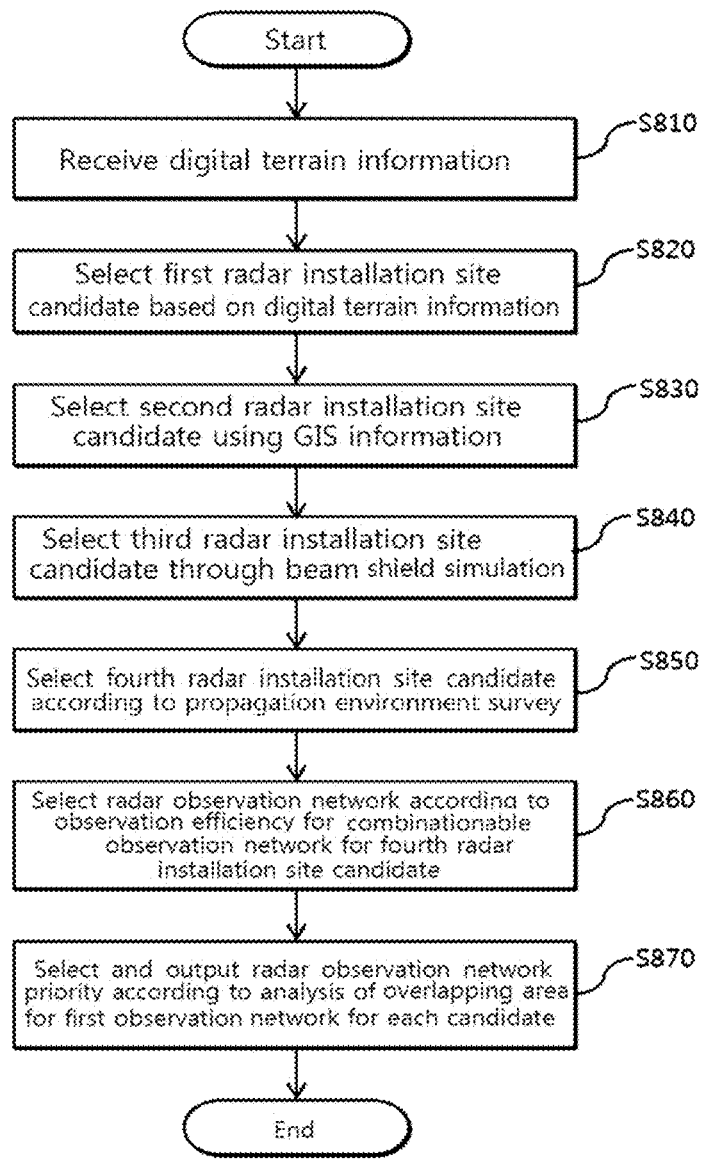
FIG. 8 is a flowchart illustrating a method for selecting a radar installation site for configuring a radar observation network according to an embodiment of the present invention.

FIG. 8 is a flowchart illustrating a method for selecting a radar installation site for configuring a radar observation network according to an embodiment of the present invention.

First, the communication unit 100 receives digital terrain information (or digital elevation model) transmitted from the server (not illustrated). Here, the digital elevation model is global terrain data generated based on data observed in the space shuttle and uses data of shuttle radar topography mission (SRTM) and basic information of the digital elevation model may be as illustrated in Table 1 above.

As an example, the communication unit 100 receives a first digital elevation model provided from the server (S810).

Thereafter, the control unit 500 selects a first radar installation site candidate based on the received digital terrain information (or the digital elevation model).

That is, the control unit 500 sets (or selects) a target area to which a radar (e.g., including a weather radar, etc.) is to be installed from the received digital terrain information. At this time, the target area to which the radar is to be installed may be preset or may be selected according to user input on the digital terrain information.

Further, the control unit 500 searches (or confirms) grid points satisfying a predetermined lowest height reference (e.g., a height of 70 m or more) according to the purpose of the user in the digital terrain information for the set target area and groups grid points adjacent to each other 2D-spatially into one group to generate one or more groups. In this case, when the grid points having the lowest height reference or more are continuously adjacent to each other in an east-west direction (or an x-axial direction) and/or a north-south direction (or a y-axial direction), the control unit 500 defines the grid points as the same group as each other.

Further, the control unit 500 selects as a small area at least one group remaining after excluding (or removing) the groups including the grid points having the highest height reference or more from the radar installation site candidates in the group by applying a predetermined highest height reference (e.g., height of 500 nm or less) among one or more groups.

Further, the control unit 500 calculates a spatial texture σ with all the grid points in the small area through the following Equation 1 based on the grid point having the highest height in at least one selected small area, by considering that it is advantageous to secure a radar observation viewing angle when the grid point having the highest height of the at least one selected small area is relatively higher than the height of the adjacent neighboring grid point.

That is, the control unit 500 calculates a mean square of the squared deviation for the highest height of grid points in the small area to calculate a spatial texture of all grid points in the small area based on the grid point having the highest height in the small area.

Further, the control unit 500 selects as a first radar installation site candidate at least one remaining small area excluding a small area in which a spatial texture σ calculated by at least one small area is smaller than a predetermined threshold value $\sigma_T$ (e.g., 50 m) among the at least one selected small area.

Figure 9:
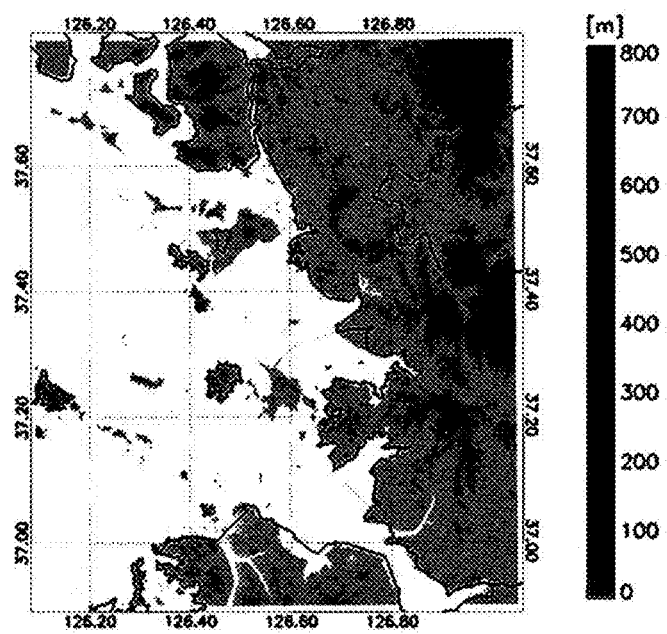
FIG. 9 is a diagram illustrating an example of a target area according to an embodiment of the present invention.

As an example, as illustrated in FIG. 9, the control unit 500 sets target areas (e.g., altitude: 36.8° N to 37.8° N, longitude: 126.0° E to 127.0° E) for the west metropolitan area from the received first digital elevation model.

Figure 10:
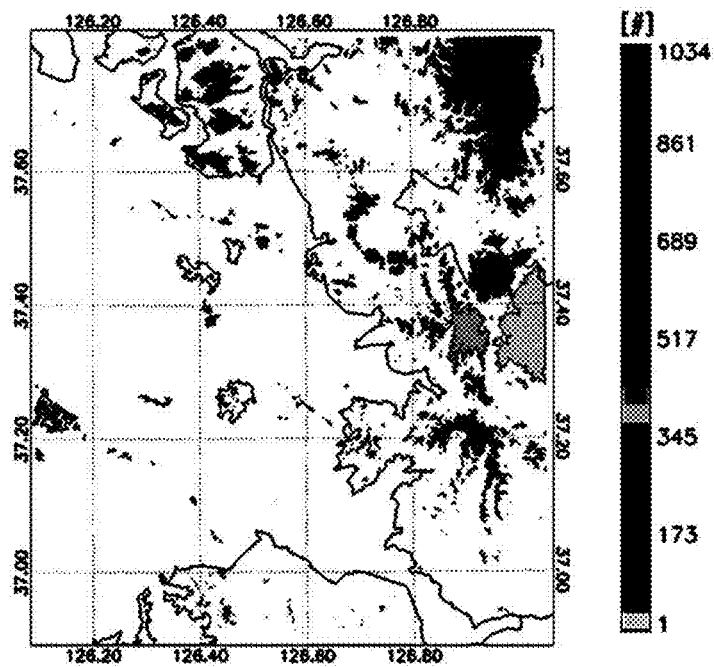
FIG. 10 is a diagram illustrating a site searching result using terrain height data according to an embodiment of the present invention.

Further, as illustrated in FIG. 10, the control unit 500 groups the set target areas of the west metropolitan area when grid points satisfying a predetermined lowest height reference of 70 m in the first digital elevation model are adjacent to each other in an east-west direction or a south-north direction and continuously exist and determines a total of 1,035 groups.

Further, the control unit 500 selects as a small area 1,032 groups which remain by removing 3 groups including the grid points having a predetermined highest height reference of 500 m or more from 1,035 groups at the candidate site.

Further, the control unit 500 calculates spatial textures with all grid points in the small area based on the grid point having the highest grid point in the small area with respect to 1,032 selected small areas through Equation 1 above, respectively.

Figure 11:
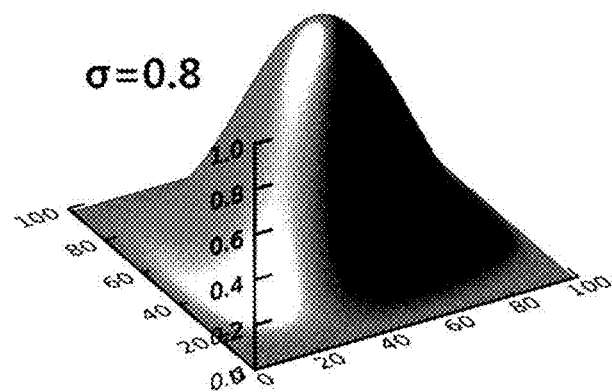
FIGS. 11 and 12 are diagrams illustrating examples of textures according to an embodiment of the present invention.
Figure 12:
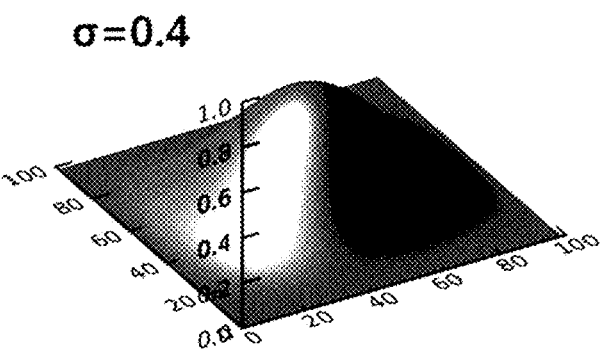

At this time, as illustrated in FIG. 11, when the calculate spatial texture σ (e.g., 80 m) is large, as the height is rapidly increased up to the highest height point, it is suitable for a radar installation site, and as illustrated in FIG. 12, when the calculated spatial texture σ (e.g., 40 m) is small, the height is gently increased up to the highest height point and thus it is not suitable for the radar installation site.

Further, the control unit 500 selects as a first radar installation site candidate 78 small areas which remain by excluding 954 small areas in which a spatial texture σ calculated for each small area is smaller than a predetermined threshold value $\sigma_T$ (e.g., 50 m) from the 1,032 selected small areas (S820).

Thereafter, the control unit 500 selects a second radar installation site candidate by evaluating accessibility and available infrastructure of a radar installation site candidate which is necessarily considered for installation and operation based on geographic information system (GIS) information for the selected first radar installation site candidate.

That is, the control unit 500 evaluates whether a road exists around the selected first radar installation site candidate and the vehicle is suitable for using the corresponding road because the radar is equipment requiring periodic management and requires constant maintenance.

Further, the control unit 500 evaluates available infrastructure for a communication device and the like capable of transmitting and receiving power capable of operating the radar and the collected data. In this case, the evaluation for the available infrastructure determines whether there is a facility (e.g., including poles, artificial structures, etc.) capable of supplying the power to the vicinity of the radar installation site candidate.

As an example, the control unit 500 determines conditions including whether a road exists in each radar installation site candidate based on the GIS information with respect to the first radar installation site candidates which are the selected 78 small areas, whether a vehicle passes through the corresponding road, and whether there is a facility for supplying power within a predetermined radius and selects as the second radar installation site candidate 75 remaining small areas satisfying all the corresponding conditions excluding 3 small areas which do not satisfy the corresponding conditions (S830).

Thereafter, the control unit 500 performs a beam shield simulation on the selected second radar installation site candidate, and calculates the radar observation efficiency of the performed beam shield simulation result to select a third radar installation site candidate. Here, the beam shield simulation is a method of mathematically considering the propagation of the radar beam and calculating the shielding rate of the beam generated by the terrain using the digital elevation model. In this case, the shape of the radar beam was assumed as Gaussian and the settings required for the simulation may be set to match the data of the weather radar, as shown in Table 2 above. Therefore, experiment settings may be adjusted depending on the type of radar to be installed.

In the embodiment of the present invention, if the terrain is 10% or more in the volume of a 50 m Gaussian radar beam, it is assumed to be shielded.

That is, the control unit 500 performs a beam shield simulation for a height angle of 0.0° to 3.0° which is a predetermined range at a predetermined interval of 0.1° for the selected second radar installation site candidate in order to simulate the shield area by the terrain.

As such, the control unit 500 calculates a shield rate generated by the terrain every radar observation height angle through the beam shield simulation.

Further, the control unit 500 calculates radar observation efficiency with respect to the performed beam shield simulation result. Here, the radar observation efficiency is calculated by the number of lowest height beams which are not shielded at a predetermined target height (e.g., 1 km) or less.

Further, the control unit 500 selects as a third radar installation site candidate at least one small area in which the radar observation efficiency calculated for each second radar installation site candidate is more than a predetermined radar observation efficiency threshold (e.g., 50%) in at least one small area, second radar installation site candidate.

For example, the control unit 500 performs beam shield simulations for predetermined height angles of 0.0° to 3.0° at predetermined 0.1° intervals with respect to the second radar installation site candidates of the selected 75 small areas.

Further, the control unit 500 calculates radar observation efficiency with respect to the performed beam shield simulation result.

Further, the control unit 500 selects a third radar installation site candidate 70 small areas in which the radar observation efficiency calculated for each of 75 small areas is more than 50% which is the predetermine radar observation efficiency threshold among the selected 75 small areas as the second radar installation site candidate (S840).

Thereafter, the control unit 500 examines propagation output and bands that can be operated for each radar installation site candidate and performs a radio interference examination for the selected third radar installation site candidate using measuring equipment (not illustrated) such as a spectrum analyzer (not illustrated) and a directional antenna (not illustrated) in order to determine a frequency interference at a frequency band corresponding to the radar data to select a fourth radar installation site candidate.

That is, the control unit 500 examines a propagation interference by radio interference for the selected third radar installation site candidate to select as a fourth radar installation site candidate at least one radar installation site candidate excluding radar installation site candidates detected by a signal of a predetermined specific strength (e.g., −50 dB) or more in a frequency range capable of being adjusted by the radar in the selected third radar installation site candidates.

For example, the control unit 500 matches a frequency range with radar data to be installed in the spectrum analyzer and performs observation for a predetermined time, 5 minutes at a predetermined unit, 15° unit for all directions (e.g., 0° to 360°) in order to examine a possibility of electromagnetic interference with respect to the third radar installation site candidates, which are the selected 70 small areas.

Figure 13:
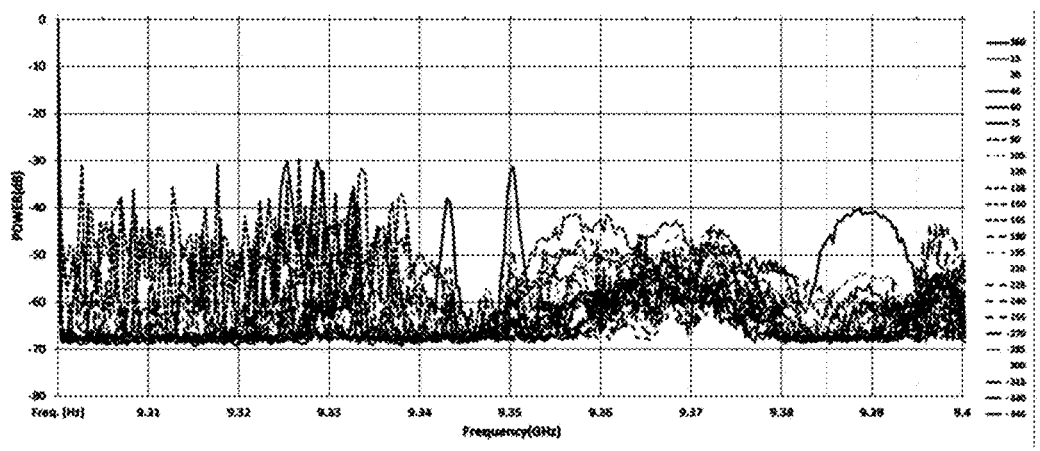
FIG. 13 is a diagram illustrating an example of a case where propagation interference is expected according to an embodiment of the present invention.

Further, as illustrated in FIG. 13, when radio interference occurs at a radar frequency band (e.g., 9.31 GHz to 9.38 GHz), the control unit 500 determines that the radar operation is hindered by observing a frequency of −50 dB or more, which is a predetermined strength over the entire area and the corresponding point is excluded from the radar installation site candidate.

Figure 14:
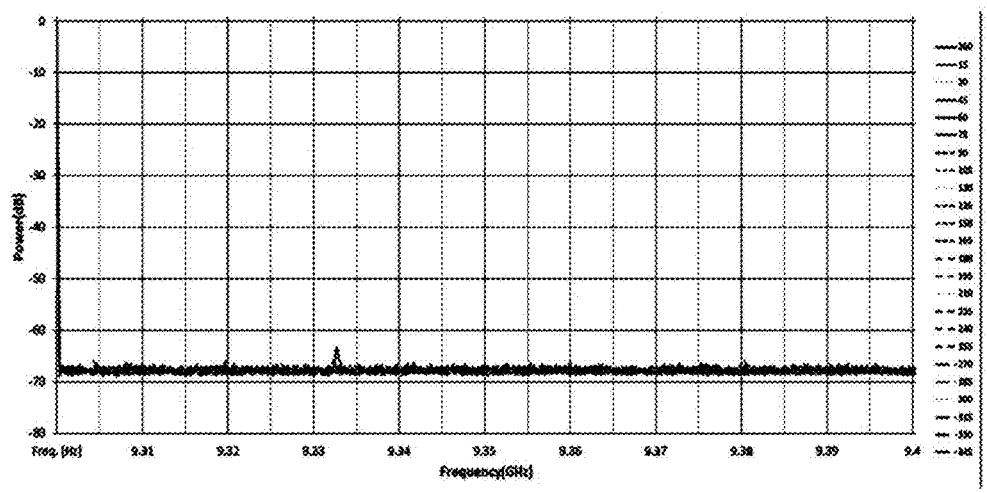
FIG. 14 is a diagram illustrating an example of a case where propagation interference is not expected according to an embodiment of the present invention.

Further, as illustrated in FIG. 14, when the radio interference does not occur at the radar frequency band (e.g., 9.31 GHz to 9.38 GHz), the control unit 500 determines that there is no propagation interference during the radar operation by observing a frequency of −70 dB lower than −50 dB which is the predetermined specific strength over the entire area and selects the corresponding point as the fourth radar installation site candidate to select 60 small areas remaining by excluding 15 small areas from the third radar installation site candidates of 75 small areas as fourth radar installation site candidates (S850).

Thereafter, the control unit 500 selects a radar observation network according to target height observation efficiency (or target height observation efficiency of the observation network) for each combinationable observation network for the selected fourth radar installation site candidate.

That is, the control unit 500 configures all combinationable observation networks according to the number of radars to be used in a predetermined observation network for the selected fourth radar installation site candidate.

Further, the control unit 500 acquires (or selects) at least one combined observation network as the fourth radar installation site candidate by excluding an observation network having no radar overlapping area in a predetermined observation radius from all the combined observation networks configured as the fourth radar installation site candidate.

Further, the control unit 500 selects an area to be observed (or an area to be observed for each observation network) with respect to at least one combined observation network for each obtained fourth radar installation site candidate.

Further, the control unit 500 calculates target height observation efficiency (or target height observation efficiency of the observation network) for the selected area to be observed for each observation network. Here, the target height observation efficiency is calculated by the number of lowest height beams of an observation network which is not shielded at a predetermined target height or less.

Further, the control unit 500 selects an observation network, in which each calculated target observation efficiency is more than a predetermined threshold (e.g., 80%) with respect to the area to be observed for each observation network, as a first observation network for each fourth radar installation site candidate (or a first observation network for each radar installation site candidate).

Figure 15:
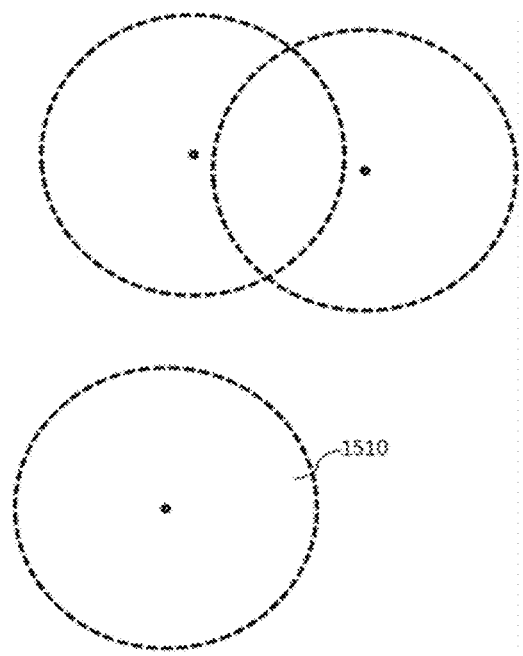
FIG. 15 is a diagram illustrating an example of a case of being excluding from a radar observation network according to an embodiment of the present invention.

For example, the control unit 500 configures all combinationable observation networks according to the number of three radars to be used in a predetermined observation network for the selected fourth radar installation site candidate. In this case, as illustrated in FIG. 15, the control unit 500 acquires at least one combined observation network as the corresponding fourth radar installation site candidate by excluding an observation network 1510 in which a radar overlapping area does not exist.

That is, the control unit 500 may configure the observation network combination using binomial coefficients that do not allow duplication.

For example, when the radar installation site candidates are five points A, B, C, D, and E and the number of radars to be used in the observation network is 3, the control unit 500 may configure 10 combinations (e.g., A,B,C, A,B,D, A,B,E, A,C,D, A,C,E, A,D,E, B,C,D, B,C,E, B,D,E, and C,D,E) of the observation networks through combinations of $_5C_3$.

Further, the control unit 500 selects an area to be observed with respect to at least one combination of the observation networks for each obtained fourth radar installation site candidate.

Further, the control unit 500 calculates target height observation efficiency for the selected area to be observed for each observation network.

Further, the control unit 500 selects 20 observation networks in which the calculated target height observation efficiency is more than a predetermine threshold of 80% with respect to the area to be observed for each observation network among the 60 fourth radar installation site candidates as first observation networks for each radar installation site candidate (S860).

Thereafter, the control unit 500 selects a radar observation network priority according to analysis of the overlapping area for the first observation networks for each selected radar installation site candidate and outputs the observation networks according to the selected radar observation network priority.

That is, the control unit 500 calculates a ratio of a duplicated observation (or overlapping observation) area at a predetermined target height (e.g., 1 km) (or an area where the area to be observed is overlapped at the target height) of two or more radars in the area to be observed of the first observation network with respect to the first observation network for each selected radar installation site candidate.

Further, the control unit 500 determines (or arranges) the ranking in order of a higher calculated ratio of a duplicated observation area of two or more radars in the area to be observed of the first observation network and displays (or outputs) the observation networks according to the arranged ranking.

Further, the control unit 500 may finally select an observation network having the highest calculated ratio of the duplicated observation area of two or more radars in the area to be observed of the first observation network as a radar observation network site.

Figure 16:
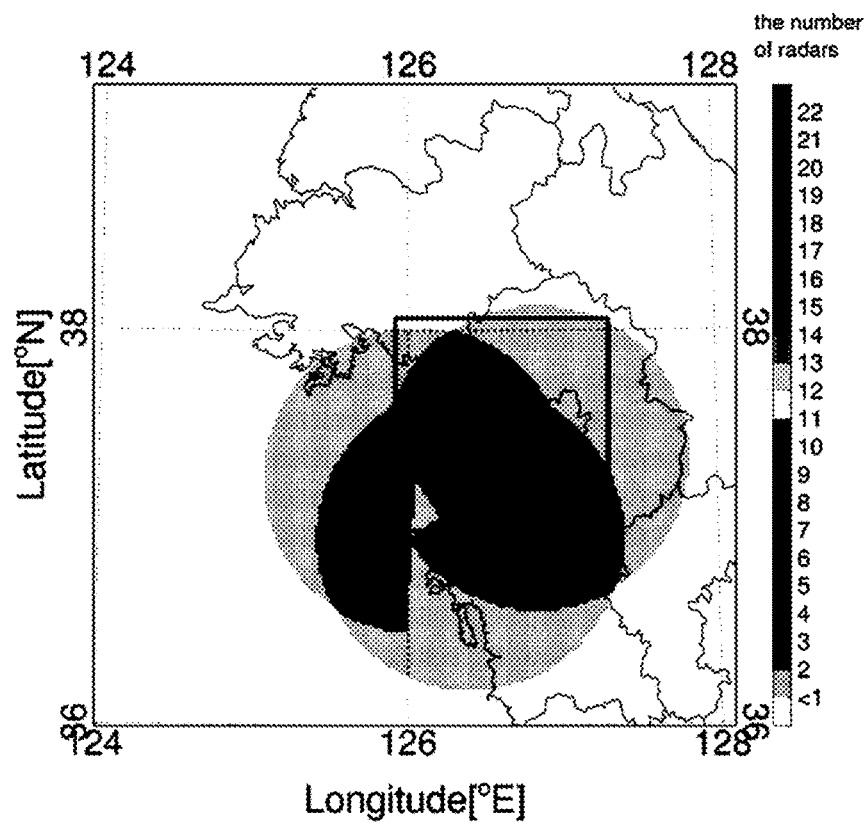
FIG. 16 is a diagram illustrating an example of a radar overlapping area according to an embodiment of the present invention.

For example, as illustrated in FIG. 16, the control unit 500 calculates the number of observable radars at a target height (e.g., 1 km) or less in which the shielding is considered and an overlapping area in the area to be observed of the first observation network in a black rectangular area. At this time, the control unit 500 calculates a ratio of duplicated observation areas of two or more radars in the area to be observed.

Further, the control unit 500 arranges the 20 fourth radar installation site candidates in order of a higher ratio of the overlapping area of the area to be observed at the target height calculated for the 20 fourth radar installation site candidates and then outputs information on the arranged fourth radar installation site candidates (S870).

As described above, according to the embodiment of the present invention, an optimal radar observation point is selected through a digital elevation model, GIS information, a beam shield simulation, a propagation environment survey, etc., to collect higher accurate radar data and shorten a time required for a radar installation preliminary survey, etc.

Further, after configuring all combinations of observation networks available according to the number of radars to be used as an observation network for a final selected candidate, excluding an observation network without an overlapping area, calculating target height observation efficiency of the observation network in one or more final observation target areas selected, selecting at least one observation network in which the calculated target height observation efficiency of the observation network exceeds a predetermined reference value as a first observation network, calculating a ratio of areas to be observed by two or more radars in an observation target area of the calculated first observation network, ranking the observation network according to the ratio of the areas observed by two or more radars in the observation target area of the calculated first observation network, and outputting the observation network according to the ranking, and a radar installation site is selected considering installation cost, feasibility, etc., to reduce cost and increase total operation efficiency.

The present invention can be widely used in a meteorological service field, a control service field, a civil engineering field, etc. by selecting an optimal radar observation point through a digital elevation model, GIS information, a beam shield simulation, a propagation environment survey, etc., to collect higher accurate radar data and shorten a time required for a radar installation preliminary survey, etc.

The aforementioned contents can be corrected and modified by those skilled in the art without departing from the essential characteristics of the present invention. Accordingly, the various embodiments disclosed herein are not intended to limit the technical spirit but describe with the true scope and spirit being indicated by the following claims. The protection scope of the present invention should be construed based on the following appended claims and it should be appreciated that the technical spirit included within the scope equivalent to the claims belongs to the present invention.

What is claimed is:

1. A method for selecting a radar installation site for configuring a radar observation network, the method comprising:
receiving, by a communication unit, digital terrain information transmitted from a server;
selecting, by a control unit, a first radar installation site candidate based on the received digital terrain information;
selecting, by the control unit, a second radio site candidate by evaluating accessibility and an available infrastructure of the radar installation site based on geographic information system (GIS) information for the selected first radar installation site candidate;
selecting, by the control unit, a third radar installation site candidate by performing a beam shield simulation for the selected second radar installation site candidate, and calculating radar observation efficiency for a result of the performed beam shield simulation;
selecting, by the control unit, a fourth radar installation site by performing a radio interference examination for the selected third radar installation site candidate;
selecting, by the control unit, a radar observation network depending on target height observation efficiency for each combinationable observation network for the selected fourth radar installation site candidate; and
selecting, by the control unit, a radar observation network priority depending on analysis of an overlapping area for the first observation network for each selected radar installation site candidate.

2. The method of claim 1, wherein the selecting of the first radar installation site candidate includes:
setting a target area in which a radar is to be installed from the received digital terrain information;
confirming grid points satisfying a predetermined lowest height reference according to the purpose of a user in the digital terrain information with respect to the set target area, grouping grid points which are adjacent to each other 2D-spatially, and generating one or more groups;
selecting as a small area at least one group which remains after excluding a group including a grid point where a highest height of the grid point is equal to or higher than a predetermined highest height reference in the group from the radar installation site candidate, among the one or more grouped groups;
calculating a spatial texture with all grid points in the small area around the grid point having the highest height in the at least one selected small area; and
selecting as the first radar installation site candidate one or more remaining small areas after excluding a small area where the spatial texture calculated for each small area is smaller than a predetermined threshold value among the one or more selected small areas.

3. The method of claim 1, wherein the selecting of the second radar installation site candidate includes:
determining conditions including whether a road exists in each radar installation site candidate based on the GIS information with respect to the selected first radar installation site candidate, whether a vehicle is capable of passing through the corresponding road, and whether there is a facility for supplying power within a predetermined radius and selecting as the second radar installation site candidate a small area satisfying all of the conditions in the selected first radar installation site candidate.

4. The method of claim 1, wherein the selecting of the third radar installation site candidate includes:
performing a beam shield simulation for height angles of 0.0° to 3.0° which are a predetermined range at a predetermined interval of 0.1° for the selected second radar installation site candidate in order to simulate the shield area by the terrain;
calculating radar observation efficiency for the performed beam shield simulation result; and
selecting as the third radar installation site candidate at least one small area in which the radar observation efficiency calculated for each second radar installation site candidate is more than a predetermined radar observation efficiency threshold among the one or more small areas, second radar installation site candidates.

5. The method of claim 1, wherein the selecting of the fourth radar installation site candidate includes:
examining a propagation interference by radio interference for the selected third radar installation site candidate and selecting the fourth radar installation site candidate at least one radar installation site candidate excluding radar installation site candidates detected by a signal of a predetermined specific strength or more in a frequency range capable of being adjusted by the radar in the selected third radar installation site candidates.

6. The method of claim 1, wherein the selecting of the radar observation network includes:
configuring all combinations of the observation networks according to the number of radars to be used in a predetermined observation network for the selected fourth radar installation site candidate;
acquiring at least one combination of the observation networks as the fourth radar installation site candidate by excluding an observation network having no radar overlapping area in a predetermined observation radius from all the combinations of the observation networks configured as the fourth radar installation site candidate;
selecting an area to be observed with respect to at least one combination of the observation networks for each acquired fourth radar installation site candidate;
calculating target height observation efficiency for the selected area to be observed for each observation network; and
selecting an observation network, in which each calculated target observation efficiency is more than a predetermined threshold with respect to the area to be observed for each observation network, as a first observation network for each fourth radar installation site candidate.

7. The method of claim 1, wherein the selecting of the radar observation network priority includes:
calculating a ratio of a duplicated observation area at a predetermined target height of two or more radars in the area to be observed of the first observation network with respect to the first observation network for each selected radar installation site candidate;
arranging the ranking in order of a higher calculated ratio of a duplicated observation area of two or more radars in the area to be observed of the first observation network; and
displaying the observation networks according to the arranged ranking.

8. An apparatus for selecting a radar installation site for configuring a radar observation network, the apparatus comprising:

a communication unit configured to receive digital terrain information transmitted from a server; and a control unit configured to select a first radar installation site candidate based on the received digital terrain information, select a second radio site candidate by evaluating accessibility and an available infrastructure of the radar installation site based on geographic information system (GIS) information for the selected first radar installation site candidate, select a third radar installation site candidate by performing a beam shield simulation for the selected second radar installation site candidate, and calculating radar observation efficiency for a result of the performed beam shield simulation, select a fourth radar installation site by performing a radio interference examination for the selected third radar installation site candidate, select a radar observation network depending on target height observation efficiency for each combinationable observation network for the selected fourth radar installation site candidate, and select a radar observation network priority depending on analysis of an overlapping area for the first observation network for each selected radar installation site candidate.

* * * * *